July 7, 1959     O. L. TAYLOR     2,894,103

ELECTRIC HEATER CONTROL

Filed April 12, 1955     3 Sheets-Sheet 1

INVENTOR
Owen L. Taylor

BY
Arthur T. Stratton
ATTORNEY

July 7, 1959  O. L. TAYLOR  2,894,103
ELECTRIC HEATER CONTROL
Filed April 12, 1955  3 Sheets-Sheet 2

United States Patent Office 2,894,103
Patented July 7, 1959

2,894,103

ELECTRIC HEATER CONTROL

Owen L. Taylor, Easton, Conn., assignor to The Bryant Electric Company, Bridgeport, Conn., a corporation of Connecticut Application April 12, 1955, Serial No. 500,763

7 Claims. (Cl. 219—20)

My invention relates generally to the control of electric heating elements and to electric switches for effecting control of such elements, and more particularly to a variable type of heating element control including a variable position electric switch for controlling the elements.

At the present time, it is the customary practice in designing domestic appliances, such as electric ranges, to control the current flowing through an electrical heating element by means of a multiple position switch whereby various heat output conditions are obtained. Most such switches have, however, been limited in that only a given wattage can be dissipated for a given switch position and the number of switch positions have been limited due to practical design and cost reasons. Inasmuch as such appliances are in competition with appliances using gas for a heating medium, wherein a substantially infinite range of heat dissipation can be obtained by merely turning a petcock, it is desirable to obtain a relatively simple type of infinite step electrical control switch for an electrical heating element.

Accordingly, one object of my invention is to provide a new and improved electrical switch having an infinite number of control positions between given limits.

Another object of my invention is to provide a new and improved electrical switch having novel bimetallic means for varying the length of time a series connected electrical heating element is energized.

Another object of my invention is to provide new and improved cycling means for controlling the current flow through an electrical heating element.

Still another object of my invention is to provide a new and improved electrical switch which utilizes a rotatable mercury button in conjunction with a spiral bimetallic element for controlling an electrical heating element.

Yet another object of my invention is to provide a new and improved electrical switch which utilizes a spiral bimetallic element through which the current passes to cause said bimetallic element to vary the length of time current flows to a heating element.

These and other objects of my invention will become more apparent upon consideration of the following detailed description of preferred embodiments of my invention when taken in conjunction with the attached drawings, in which.

Figure 1:
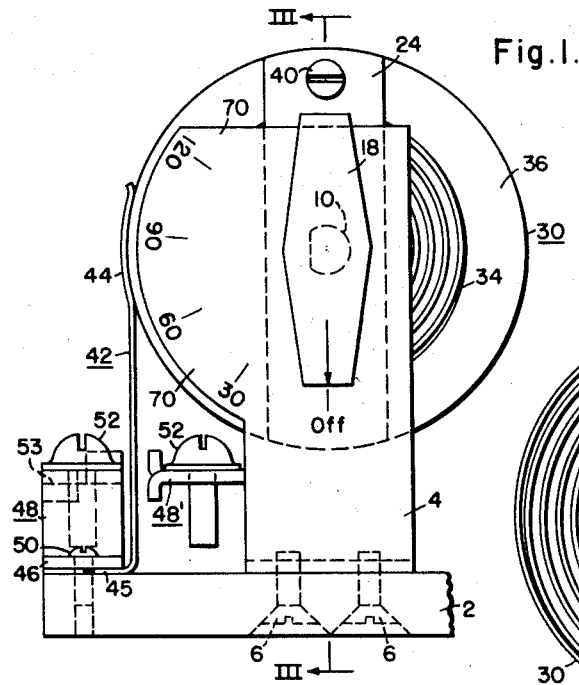
Figure 1 is a front elevational view of a switch constructed in accordance with the principles of my invention.

Referring to the drawings, it will be noted that a switch constructed in accordance with the principles of my invention may comprise an elongated base 2 which may be fabricated from any suitable structural material having sufficient strength, and is preferably fabricated from an insulating material, such as a synthetic resin, in order that electrical terminals may be directly attached thereto. An L-shaped support 4 is rigidly secured to the base 2 by any suitable means, such as by screws 6 extending through openings from the underside of base 2 and threadedly engaging the short leg of the support 4. The elongated leg of support 4 extends upwardly approximately perpendicular to the base 2 and is provided with a centrally disposed opening adjacent its upper edge in which a tubular shaft support 8 is secured in a suitable manner.

Figure 3:
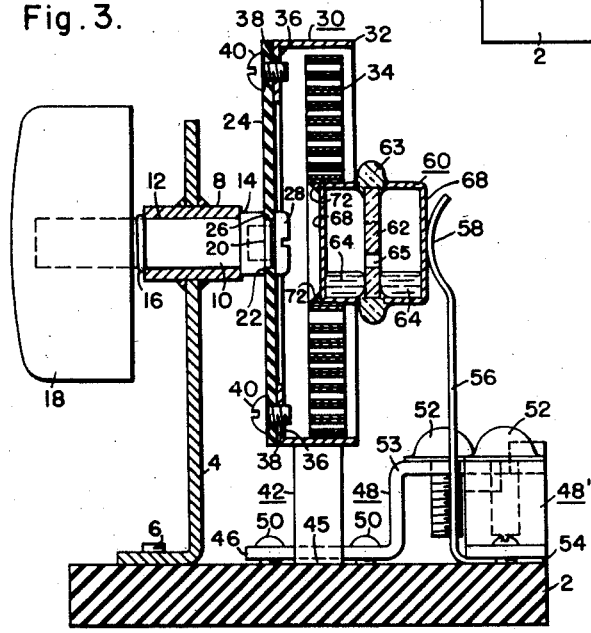
Fig. 3 is a cross-sectional view of the switch shown in Fig. 1, taken substantially along the lines III—III thereof.

Supports 4 and 8 may be made from any suitable material having sufficient structural strength and are preferably fabricated from a metal, such as brass, whereby support 8 may be secured to support 4 by brazing. A rotatable shaft 10, which may be made from any suitable material, such as a metal or plastic having sufficient structural strength, is positioned within the central opening 12 of support 8 in any suitable manner. The front or left side of the switch, as shown in Fig. 3, is provided with a suitable handle 18 which is secured to the shaft 10 in any suitable manner, not shown. Shaft 10 is secured against longitudinal movement relative to support 8 by providing its inner end with an enlarged portion 14 which engages the back end of the support 8, and a clamping means, such as a split retaining ring 16, which engages the front end of support 8. Handle 18 may be made from a wide variety of materials having sufficient structural strength, and is preferably fabricated from an insulating material, such as molded plastic, for safety purposes.

The end of shaft 10 inwardly of enlarged portion 14 is reduced in diameter in order to form a short end portion 20 and to form an annular ledge 22 around the projection 20. A support disk 24, which is fabricated from any suitable insulating material, such as a plastic insulating material, is provided with a central opening 26 whereby the disk 24 may be located on the shaft end portion 20 by abutting it against the ledge 22, and secured thereto by any suitable means, such as a machine screw 28 threadedly engaging a central tapped opening in the shaft end portion 20, which has a head extending over the back surface of the disk 24. Secured to the periphery of disk 24 is a supporting ring 30, which is fabricated from any suitable electrical conducting material, such as copper or brass, and it includes a circular band portion 32 radially spaced from the shaft 10 a sufficient distance to receive a bimetallic element 24, hereinafter described. As shown, the front edge of band 32 of ring 30 is provided with an integral flange 36 which extends from this edge of band 32 towards the shaft 10. Flange 36 is provided with at least a pair of diametrically opposed threaded openings 38 therein. The disk 24 extends radially outward from the shaft 10 so that its outer edge is approximately flush with the outer edge of band 32 of ring 30, and it is provided with a pair of diametrically opposed clearance openings through which suitable fastening means, such as screws 40, extend and threadedly engage the threaded openings 38 in the flange 36 of ring 30. By such construction, handle 18, shaft 10, disk 24 and the ring 30 may be rotated as a unit.

As more clearly shown in Fig. 1, electrical contact is made to ring 30 by means of a contact brush 42, which is formed from any suitable electrical conducting material, such as copper or brass, and which is provided with a formed end portion 44 having a curvature whereby the portion 44 engages the outer surface of band 32 of ring 30. Contact 42 is L-shaped and extends toward base 2 and where its short leg 45 is secured to base 2 by any suitable means, such as by being located between the base 2 and a leg 46 of a formed terminal 48. In order to insure good electrical contact between the leg 46 of terminal 48 and the leg 45 of contact brush 42, a screw 50 is located on each side of the leg 45 of contact brush 42 and extends through the leg 46 of the terminal 48 and threadedly engages the base 2. The other end of the terminal 48 may be formed in any suitable manner to provide means for establishing an electrical connection thereto, such as by means of a screw 52 threadedly engaging an offset arm 53. A second terminal 48' which is of the same construction as the terminal 48 previously described, and which is also secured to base 2 in the same manner as the terminal 48, is provided for establishing electrical contact to the short leg 54 of a second L-shaped contact 56, which is similar to the contact 42, previously described. Contact 56 is provided with a curved outer end portion 58, as shown; however, portion 58 is provided with a somewhat sharper curvature than the upper portion 44 of contact 42.

Figure 2:
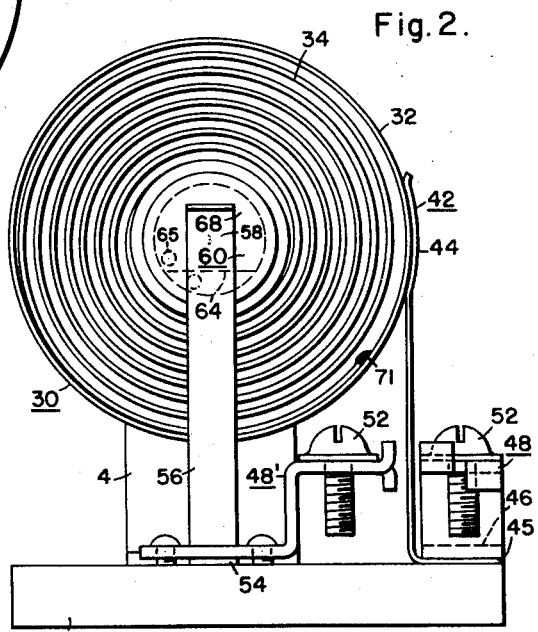
Fig. 2 is a back elevational view of the switch shown in Fig. 1.

As has been indicated, a thermostatic bimetallic element 34 is located within the ring 30, and is fabricated from any one of a wide variety of suitable thermostatic bimetallic materials comprising a laminated strip of two different metals, one of which has a higher coefficient of expansion than the other, such as brass and steel. Bimetal 34 is formed in a flat spiral having its outermost end secured to the inner surface of band 32 at 71 (Fig. 2) and its innermost end secured to one contact 68 of a circular rotatably operated switch 60, as at 72 (Fig. 3), in any suitable manner, such as by brazing.

As shown in Fig. 3, the switch 60 is of the mercury button type using a liquid contact circuit closer having a pair of cup-shaped metal contacts 68 which are separated by an insulating diaphragm 62 which is formed from any suitable insulating material, such as a ceramic material. The edges of the contacts 68 are sealed by a bead 63 of glass which also seals the junction between the diaphragm 62 and the contacts 68. Within the space enclosed by the contacts 68 is a suitable quantity of mercury 64 which forms the conducting medium between the contact 68. Diaphragm 62 is provided with an opening 65 which may be submerged in the mercury 64 so that the mercury 64 establishes an electrical conducting path between contacts 68 when the switch 60 is rotated to its circuit conducting position. As shown, switch 60 is in the circuit interrupting position with opening 65 located above the mercury 64 and the contacts 68 are separated by the insulating diaphragm 62. Inasmuch as such switches are well known in the art, it is not believed necessary to more fully describe their construction. As previously indicated, one contact 68 is secured at 72 to the inner end of the bimetal 34, while the other contact 68 is adapted to be engaged by the curved portion 58 of the contact 56.

If desired, and as shown in Fig. 1, the support 4 may be provided with an outwardly extending portion 70 upon which are located various designations to indicate the approximate degrees of travel of the handle 18 upon rotation thereof from an "off" position. Although the normally "off" position of switch 60 may be varied by appropriately designing switch 60, such position preferably occurs when handle 18 is vertical. Further, as bimetal element 34 is secured to ring 30 and the switch 60 is secured to the bimetal element 34, rotation of the handle 18 will cause both the bimetal 34 and the switch 60 to be rotated as a unit with shaft 10.

In operation, when the handle 18 is rotated clockwise with relation to Fig. 1, such movement will cause the entire structure comprising the shaft 10, disk 24, ring 30, bimetal 34 and switch 60 to rotate, whereby the contacts 68 are electrically bridged by the mercury 64 and, accordingly, current will flow through the switch 60. When contacts 68 of the switch 60 are so bridged, a circuit is established between one terminal 48, contact 42, ring 30, bimetallic element 34, switch 60, and contact 56, to the other terminal 48'. It will particularly be noted that any current flowing in a circuit controlled by such a switch must flow through the bimetal 34. As is well known in the art, by placing the metal of a bimetal having the greater coefficient of expansion on the outer side of a counterclockwise (as seen in Fig. 1) formed spiral, such as bimetal 34, and with its outer end held stationary, the bimetal will rotate counterclockwise (Fig. 1) when heated. Due to the resistive component of bimetal 34, the current flowing therethrough will cause the temperature of the bimetal 34 to rise and rotate the switch 60 counterclockwise (Fig. 1) back to its initial "off" position. When the switch 60 is at its initial "off" position, current ceases to flow through the bimetal 34 and the bimetal 34 will be cooled. As bimetal 34 cools, the internal stress thereof caused by heating will be released, whereby bimetal 34 will rotate clockwise so as to again cause the switch 60 to establish a circuit. Thus, it will be noted that the switch will cycle between "off" and whichever "on" position the handle 18 is adjusted to. Obviously, if the angle required to turn the switch 60 back to the "off" position is small, little energy must be put into the bimetal 34 to rotate the switch 60 to the off position; and thus, a normally short heating time is involved. Also, as the temperature differential is relatively low, a relatively large cooling time is required before the switch 60 again remakes the circuit.

On the other hand, if the handle 18 is rotated so as to necessitate a large deflection of the bimetal 34 to position the switch 60 in the off position, a relatively high temperature must be reached by the bimetal 34, and thus, a relatively long heating time is involved. Under such circumstances, the temperature differential is relatively high and a relatively short cooling time period is involved to cause the switch 60 to again return to the on position. Such characteristics of my switch have the effect of causing current to flow for a relatively long time, while the cooling period or current off time, is relatively short. Translated into terms of heat dissipated by an electrical heating unit connected in series with my switch which heats when current is flowing and cools when the current is off in an identical manner to the bimetal 34, this means that for short increments of travel of the bimetal 34, or low positions of the handle 18, the heating time is relatively short and cooling time relatively long so that the wattage dissipated per unit of time by the heating unit is relatively low. Also, when the handle 18 is positioned in a high heat position, the energized time of the heating unit is relatively high and the cooling time relatively low so that the wattage dissipated by this unit per unit of time is relatively high. Inasmuch as handle 18 may be freely rotated to a variety of positions between off and a high wattage dissipation, obviously the heat output of a heating unit may be infinitely varied between such ranges. Although, as shown, reference numerals are provided on support 4 with reference to a clockwise rotation of handle 18, my switch is equally adaptable for counterclockwise rotation. Also, if desired, the construction of bimetal 34 can be varied by exchanging the location of the two dissimilar metals to obtain the reverse rotational movement of switch 60.

In order to insure that the switch will continually cycle from "on" to "off" as described, it is necessary that the forces resulting from the heating of the bimetal 34 cause only the switch 60 and the bimetal 34 to move and that the ring 30 remain stationary after being located as desired by the manual adjustment of the handle 18. Although such purpose may be accomplished in various suitable ways, one convenient method is to provide a sufficiently close tolerance fit between the shaft 10 and support 8 whereby a sufficient counteracting frictional force is obtained therebetween to normally prevent rotation of the ring 30. In view of the large mass of ring 30 and shaft 10 compared to switch 60 such a force need not be of a magnitude so as to interfere with manual rotation of the handle. Further, contact brush 42 should be formed from a material having some resiliency so as to be biased into engagement with ring 30, and increase the counteracting frictional force.

Figure 7:
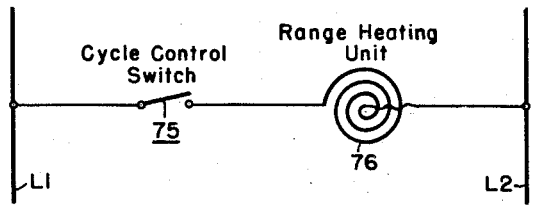
Fig. 7 is a circular diagram of a heating element and a control means therefor constructed in accordance with the principles of my invention.

A further feature that may be incorporated in the cycling switch means described relates to its use for controlling a heating element to which a voltage greater than the safe operating voltage is initially applied in order to obtain an initial rapid heating of the heating element. As shown in Fig. 7, a cycling control switch 75 constructed in accordance with the principle of my invention is connected in series circuit with a standard electrical single element heating element 76, which circuit is connected across a source of electrical energy represented conductors $L_1$ and $L_2$. In accordance with this invention, the heating element 76 is operated at an overvoltage, the voltage across conductors $L_1$ and $L_2$ must be above the voltage the heating element 76 is designed to take for safe continuous operation. For household range operation, the normal maximum voltage obtainable is 220 volts and for such service a heating element 76 is utilized which may be continuously operated at some lower voltage, such as 110 volts, which is also normally available in household range circuits.

Figure 6:
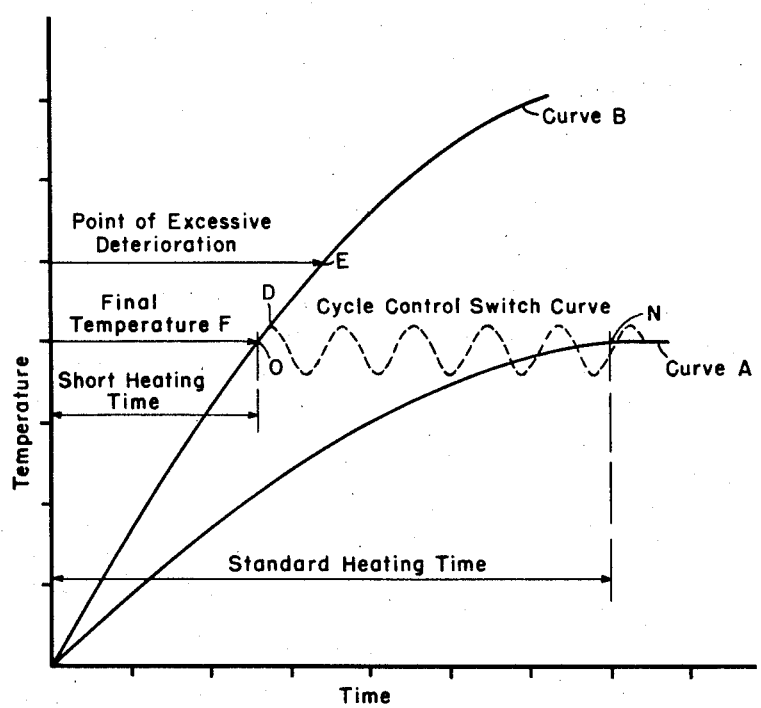
Fig. 6 is a graphical representation of the relationship of the heating time and the temperature of a heating element under various operating conditions.

Fig. 6 illustrates graphically the time rate of temperature rise of a standard heating element when operated continuously at its normal or rated voltage from an initial low temperature such as the room temperature (curve A), and the time rate of temperature rise of the same heating element when operated at an overvoltage from the same initial low temperature (curve B). From these curves, it will be noted that the heating element when operated at its normal or rated voltage continuously, reaches its final operating temperature F at point N considerably later than when it reaches the same temperature F at point O, when operated at an overvoltage. As shown in curve A, the final temperature F at point N is reached after the temperature has increased 4 units and the time has increased 7 units, whereby the ratio of the change in temperature, $\Delta F$, to the change in time, $\Delta T$, is 0.57. As shown in curve B, the ratio of $\Delta F$ to $\Delta T$ for the unit operated at an overvoltage to achieve the same final temperature F is $4 \div 2.6$ or 1.57 which is substantially 2.75 times greater than when operated at a normal voltage. Thus, the overvoltage energized element reaches the final operating temperature F in 37% [$(1 \div 2.75)100$] of the time on normal operation of the heating element. Inasmuch as the increase in temperature with each type of operation of the heating element is the same, the ratio of the change in time will indicate directly the difference in time required for overvoltage operation, that is 37% [$2.6 \div 7)100$].

It is realized that the temperature of a heating element that is operated at a voltage considerably above its normal or rated voltage, is also considerably above its operating temperature at its normal or rated voltage and that such excessive temperature will cause the heating element to deteriorate excessively. The temperature at which excessive deterioration occurs (point E, curve B) must necessarily be above the normal operating temperature of a heating element to insure that normally the heating element will function properly. Therefore, in order to prevent damage to the heating element, it is necessary that the overvoltage be removed from the heating element before the point of excessive deterioration E is reached. With the cycling switch previously described, the overvoltage is preferably removed at a point D slightly above the normal operating temperature of the heating element so that the mean temperature of the heating element from the time on during cycling of the switch is equal to the normal operating temperature F of the heating element. Thus, the characteristics of such a switch are made to be such that the heating time necessary for the bimetal 34 to reach its cycling point is the same as the heating time of the heating element to reach point D. Thereafter, the switch starts its cycling action wherein the average watthour output of the heating element is substantially the same as the watthour output of a heating element continuously energized at its normal or rated voltage.

As previously indicated, the heating and cooling times of the bimetal 34 may be varied depending upon the physical characteristics of the bimetal 34 and the number of degrees handle 18, and consequently the bimetal 34, is rotated. However, when the heating element is operated at an overvoltage at the highest heat points and with the heating time required for the bimetal 34 to reach its cycling point being equal to the time of the heating element to reach point D, it is desirable that the ratio of the "on" time of the bimetal 34 to its "off" time be limited in order to prevent the peak temperature of the heating element from reaching a point of excessive deterioration. The ratio should be limited to a value providing a temperature of the heating element not greater than the peak temperature represented by the point D. Thus, a properly designed cycling device can supply overvoltages to a heating element without the necessity of internal voltage change-over apparatus or multiple element heating elements.

Figure 4:
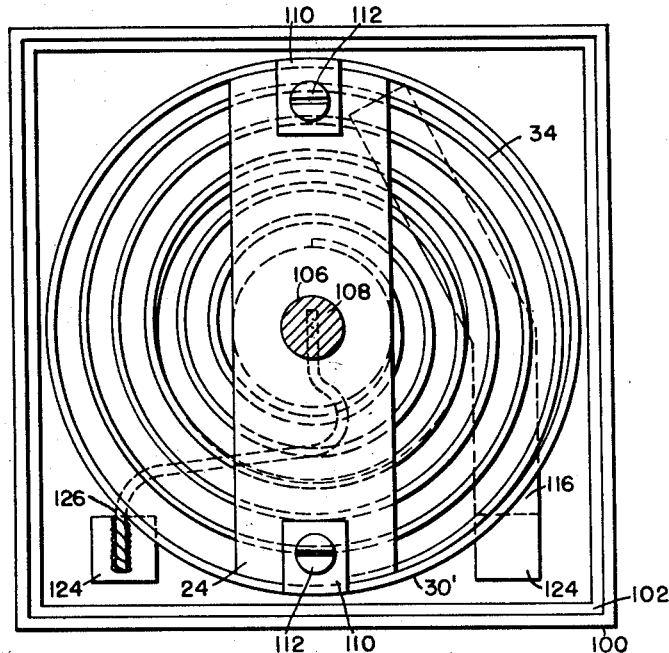
Fig. 4 is the elevational view of another switch constructed in accordance with the principles of my invention shown located in a housing with the cover thereof removed.
Figure 5:
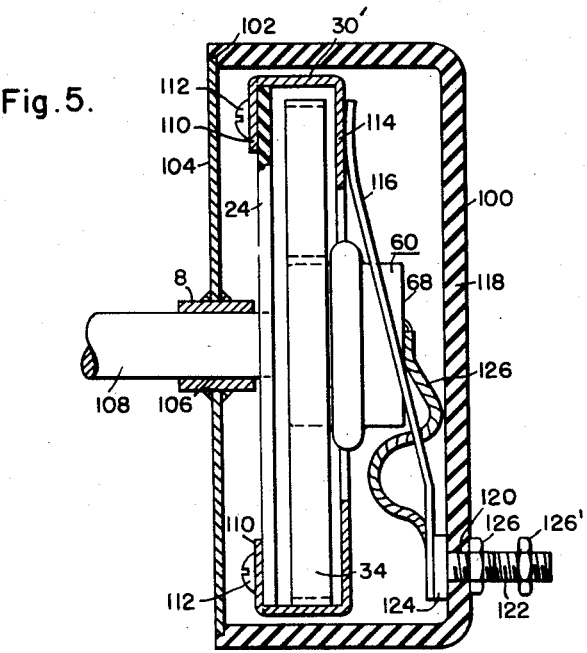
Fig. 5 is a substantially central cross-sectional view of the switch shown in Fig. 4, with portions thereof being shown in elevation.

Referring to Figs. 4 and 5, it will be noted that another form of switch constructed in accordance with the principles of my invention is shown therein, which is located within a cup-shaped housing 100, which may be formed from any suitable insulating material, such as a molded phenolic material. Housing 100 is provided adjacent its open side with an inwardly offset ledge 102 which extends around the inner edge of the housing 100 for receiving a cover 104. Cover 104 may be formed from any suitable material having sufficient structural strength, such as steel, and may be secured to housing 100 in any suitable manner such as by screws (not shown) extending therethrough and threadedly engaging the housing 100. The central portion of cover 104 is provided with an opening 106 in order to permit the operating shaft 108 for the switch to extend therethrough so the shaft 108 may be rotated within the opening 106. Although not shown, it will be realized that the end of shaft 108 extending outwardly of housing 100 may be provided with a suitable handle for rotating the shaft 108, similar to the handle 18 previously discussed. The inner end of the shaft 108 is located within the cup-shaped housing 100 and is secured to the switch in any suitable manner (not shown) such as by using the screw 28 and ledge 22 assembly previously discussed.

As the switch shown within housing 100 is quite similar to the switch previously discussed, like parts have been given identical reference numerals. It will be noted, however, that the ring 30' of this embodiment of my invention differs from the ring 30 previously described, in that the outer side thereof is provided with a pair of integral inwardly extending tabs 110 at diametrically opposite points of the ring 30' whereby it may be secured to the disk 24 in any suitable manner, such as by screws 112 extending through the tabs 110 and threadedly engaging the disk 24. The inner side of ring 30' adjacent base 118 of the housing 100 is provided with an inwardly extending flange 114 around its periphery in order to form a contact portion on the ring 30' for engagement with an elongated contact 116. A suitable support, such as the tubular support 8 previously described, is provided in opening 106 of cover 104 so that the shaft 108 is prevented from being rotated by the movement of bimetal 34.

The base 118 of housing 100 is provided with a pair of spaced openings 120 through which extend terminal members 122. Terminals 122 may be formed from any suitable electrical conducting material and, as shown, each comprise a threaded stud having a flat head 124 which extends over the opening 120 inside the housing 100 and a nut 126 which engages the outer surface of base 118 and holds the head 124 in engagement with the inner surface of the housing 100. An additional nut 126' is provided on each terminal 122 in order that electrical connections may be easily made to the terminals 122. As shown, the contact 116 is electrically and mechanically connected to the head 124 of one of the terminals 122 in any suitable manner such as by brazing or by riveting thereto. Contact 116 is formed from any suitable electrical conducting material, such as cooper or brass, and initially extends upwardly along the base 118 of housing 100 past the switch 60 and thereafter is angularly disposed so that its upper free end is located in engagement with the flange 114 of frame 30'. In order to facilitate establishing electrical contact between contact 116 and flange 114, contact 116 is preferably formed from a resilient material with its free end being curved so as to facilitate rotation of the frame 30'. The other terminal 122 has its head 124 connected by means of a flexible lead 126 of an electrical conducting material, such as stranded copper wire, to the contact 68 of switch 60, which is not connected to the bimetallic element 34. Flexible conductor 126 may be secured to both the contact 68 of switch 60 and the head 124 in any suitable manner such as by being brazed or soldered thereto.

The operation of the switch, shown in Figs. 4 and 5, is identical to that previously discussed, and accordingly, it is not believed that it need be repeated. This modification illustrates, however, a compact commercial embodiment of a switch which may easily be mounted on a panel or other suitable surface.

Having described preferred embodiments of my invention in accordance with the patent statutes, it is desired that my invention be not limited to the specific constructions illustrated, inasmuch as it will be apparent to those skilled in the art that many modifications thereof may be made without departing from the broad spirit and scope of my invention. Accordingly, it is desired that my invention be interpreted as broadly as possible, and that it be limited only as required by the prior art.

I claim as my invention:

1. A wiring device comprising, a rotatably mounted circular frame of an electrical conducting material, a coiled bimetallic element located within said frame having its outer coil electrically and mechanically connected to said frame, a circular switch comprising a pair of spaced contacts having an element movable therebetween so as to electrically connect and disconnect said contacts, said switch being supported by the inner coil of said bimetallic element with one of said switch contacts being electrically and mechanically connected to said inner coil of said bimetallic element, manually movable means for bodily rotating said frame, bimetallic element and said switch substantially uniformly so that said movable element is moved to electrically connect said contacts and a current flows through said bimetallic element, means frictionally engageable with said frame for retaining said frame at said aforementioned position, and a pair of conductors adapted to be connected to a source of electrical energy electrically connected to said frictionally engageable means and the other of said switch contacts, respectively, so that said current flow through said bimetallic element causes the portion thereof between the points it is secured to said frame and said switch to be movable in approximately a counter direction to said rotation so that said element is moved to a position where said switch contacts are electrically disconnected.

2. Electrical heating apparatus comprising, a heating element, a bimetallic element, a pair of separable electrical contact means at least one of which is mechanically and electrically connected to said bimetallic element so as to be movable with said bimetallic element to an open position and to a plurality of different closed circuit positions relative to the other contact means, means for electrically connecting said contacts, said bimetallic element and said heating element in series to a source of electrical energy, manually movable means supporting said bimetallic element and at least said one contact means for bodily movement thereof from said open circuit position to any one of the aforesaid closed circuit positions so that a current will flow through said bimetallic element, means for releasably retaining said movable means at said closed circuit positions so that said current flow through said bimetallic element causes it to deflect with relation to said movable means in a direction opposite to the direction of said bodily movement a distance corresponding to the adjustment of said manually operable member from its "off" position so as to move at least said one contact back to its open circuit position, said bimetallic element being cooled when said contacts are in an open circuit position so as to deflect a lesser distance to a closed circuit position, and thereafter will cycle back and forth through said smaller distance to alternately energize and deenergize the heating element.

3. An infinite position control for an electric heating element which is designed to operate continuously at a rated voltage without substantial deterioration, but which will deteriorate if operated continuously at higher voltages comprising, a source of voltage substantially higher than said rated voltage, said control including a movably mounted manually operable member selectively movable from an "off" position to a plurality of different "on" positions to selectively energize such a heating element to a plurality of different temperature levels, switch contacts connected in the circuit between said source and the heating element, a thermal element mounted on said manually operable element so as to be moved thereby without stressing the thermal element from said "off" position to said "on" positions, means actuated by a portion of said thermal element when at said "off" position to open said contacts and to close said contacts when said thermal element is moved to said "on" positions, and said thermal element being electrically connected in series with said circuit and constructed so as to be responsive to current flow through said circuit to cause the contact operating portion thereof to deflect back a distance corresponding to the adjustment of said manually operable element from its "off" position to the position it occupies at said "off" position to open the circuit through said contacts, whereupon said element will cool and deflect a smaller distance sufficient to again reestablish the circuit through said contacts, and thereafter will cycle back and forth through said smaller distance to alternately energize and deenergize the heating element.

4. An infinite position control arrangement comprising, a source of voltage, an electric heating element, a control device including a movably mounted manually operable member selectively movable from an "off" position to a plurality of different "on" positions to selectively energize said heating element to a plurality of different temperature levels, switch contacts connected in the circuit between said source and the heating element, a thermal element mounted on said manually operable element so as to be moved thereby without stressing the thermal element from said "off" position to said "on" positions, means actuated by a portion of said thermal element when at said "off" position to open said contacts and to close said contacts when said thermal element is moved to said "on" positions, and said thermal element being electrically connected in series with said circuit and constructed so as to be responsive to current flow through said circuit to cause the contact operating portion thereof to deflect back a distance corresponding to the adjustment of said manually operable element from its "off" position to the position it occupies at said "off" position to open the circuit through said contacts, whereupon said element will cool and deflect a smaller distance sufficient to again reestablish the circuit through said contacts, and thereafter will cycle back and forth through said smaller distance to alternately energize and deenergize the heating element.

5. An infinite position control arrangement comprising, a source of voltage, an electric heating element, a control device including a movably mounted manually operable member selectively movable from an "off" position to a plurality of different "on" positions to selectively energize said heating element to a plurality of different temperature levels, switch contacts connected in the circuit between said source and the heating element, a bimetal element mounted at one end on said manually operable element so as to be moved thereby without stressing the bimetal element from said "off" position to said "on" positions, means actuated by a portion of said bimetal element when at said "off" position to open said contacts and to close said contacts when said bimetal element is moved to said "on" positions, and said bimetal element being electrically connected in series with said circuit and constructed so as to be responsive to current flow through said circuit to cause the contact operating portion thereof to deflect back a distance corresponding to the adjustment of said manually operable element from its "off" position to the position it occupies at said "off" position to open the circuit through said contacts, whereupon said element will cool and deflect a smaller distance sufficient to again reestablish the circuit through said contacts, and thereafter will cycle back and forth through said smaller distance to alternately energize and deenergize the heating element.

6. A control as set forth in claim 1 wherein said switch is of the liquid contact type, whereby the switch does not stress the bimetallic element.

7. An infinite position control arrangement comprising, a source of voltage, an electric heating element, a control device including a movably mounted manually operable member selectively movable from an "off" position to a plurality of different "on" positions to selectively energize said heating element to a plurality of different temperature levels, a switch of the liquid contact type having contacts connected in the circuit between said source and the heating element, a coiled bimetal element mounted on said manually operable element so as to be moved thereby without stressing the bimetal element from said "off" position to said "on" positions, means actuated by a portion of said bimetal element when at said "off" position to rotatably actuate said switch to open its contacts and to rotatably actuate said switch to close its contacts when said bimetal element is moved to said "on" positions, and said bimetal element being electrically connected in series with said circuit and constructed so as to be responsive to current flow through said circuit to cause the switch operating portion thereof to deflect back a distance corresponding to the adjustment of said manually operable element from its "off" position to the position it occupies at said "off" position to open the circuit through said contacts, whereupon said bimetal element will cool and deflect a smaller distance sufficient to again reestablish the circuit through said contacts and thereafter will cycle back and forth through said smaller distance to alternately energize and deenergize the heating element.

References Cited in the file of this patent

UNITED STATES PATENTS

| Number | Name | Date |
|---|---|---|
| 1,676,923 | Phelan et al. | July 10, 1928 |
| 1,829,944 | Raney | Nov. 3, 1931 |
| 1,852,102 | Bast et al. | Apr. 15, 1932 |
| 2,148,407 | Pierson | Feb. 21, 1939 |
| 2,172,189 | Clark | Sept. 5, 1939 |
| 2,195,638 | Anderson | Apr. 2, 1940 |
| 2,276,930 | Clark | Mar. 17, 1942 |
| 2,318,698 | McCabe | May 11, 1943 |
| 2,357,225 | Roesch et al. | Aug. 29, 1944 |
| 2,487,037 | Smith | Nov. 1, 1949 |
| 2,508,350 | Belgeri | May 23, 1950 |
| 2,623,137 | Vogelsberg | Dec. 23, 1952 |

UNITED STATES PATENT OFFICE
CERTIFICATE OF CORRECTION

Patent No. 2,894,103                                           July 7, 1959

Owen L. Taylor

It is hereby certified that error appears in the printed specification of the above numbered patent requiring correction and that the said Letters Patent should read as corrected below.

Column 2, line 6, for "circular" read -- circuit --; line 62, for "24" read -- 34 --; column 5, line 64, after the opening bracket insert an opening parenthesis; column 6, line 7, for "the time" read -- that time --.

Signed and sealed this 1st day of March, 1960.

(SEAL)
Attest:

KARL H. AXLINE
Attesting Officer

ROBERT C. WATSON
Commissioner of Patents